June 30, 1959
C. H. HELBING
2,892,812
REDUCTION OF DIHYDRIC ALCOHOL LOSSES IN PREPARATION
OF POLYESTERS OF SAID ALCOHOLS AND
DICARBOXYLIC ACIDS
Filed March 23, 1954
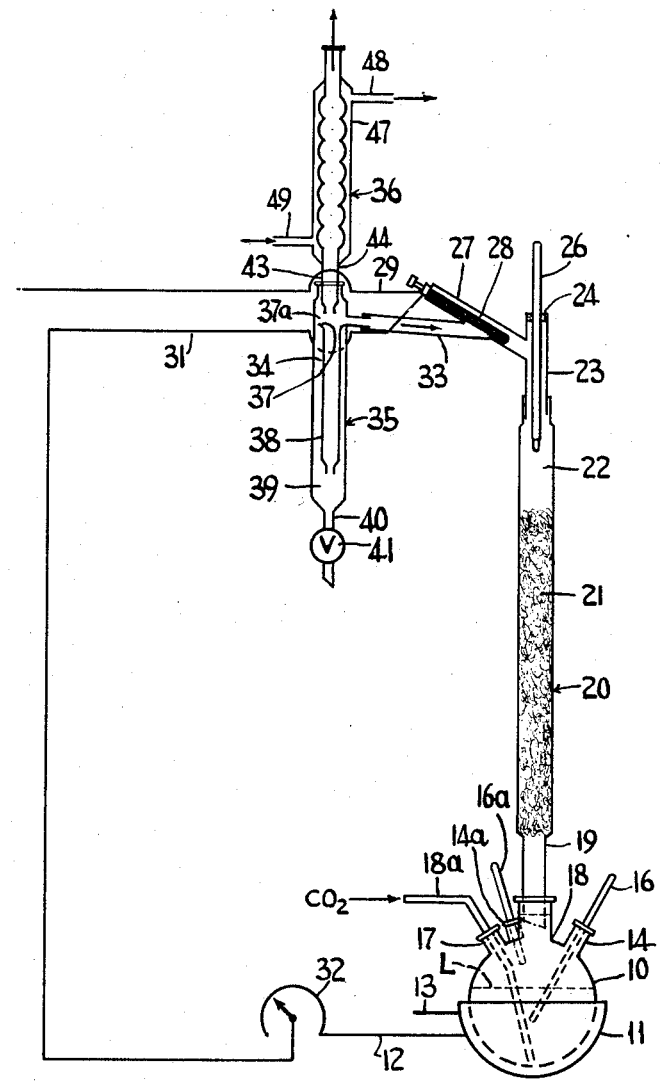
INVENTOR.
CLARENCE HELBING
BY
Oscar L. Spencer
ATTORNEY United States Patent Office 2,892,812
Patented June 30, 1959

2,892,812

REDUCTION OF DIHYDRIC ALCOHOL LOSSES IN PREPARATION OF POLYESTERS OF SAID ALCOHOLS AND DICARBOXYLIC ACIDS

Clarence H. Helbing, Shelbyville, Ind., assignor to Pittsburgh Plate Glass Company, Allegheny County, Pa., a corporation of Pennsylvania Application March 23, 1954, Serial No. 418,138

11 Claims. (Cl. 260—75)

This invention relates to the preparation of polyesters of dihydric alcohols and polybasic acids and it has particular relation to a method of and an apparatus for preparing such polyesters in which evaporational losses of the dihydric alcohol component are substantially reduced.

In the preparation of polyesters of dihydric alcohols such as trimethylene glycol or propylene glycol and alpha-beta ethylenically unsaturated dicarboxylic acid such as maleic acid or its anhydride or fumaric acid or mixtures of these acids with dicarboxylic acid (or anhydrides thereof), free of ethylenic unsaturation, such as phthalic acid or adipic acid, the dihydric alcohol (or a mixture of dihydric alcohols) and the dibasic acid (or a mixture of the two types of dibasic acids) are heated to a relatively high temperature whereby to effect esterification reaction with accompanying evolution of and evaporation of water. Usually, a non-reactive medium of low solubility in water, e.g., aromatic hydrocarbon such as xylene or toluene or other medium designed to distill azeotropically with the water of reaction and thus to promote removal of the latter from the system is included. The vapor mixture is removed and condensed and the liquid components are separated from each other by decantation. The aqueous fraction is discarded and the medium is returned to the reaction zone.

It has been observed that in the operation of such system, the dihydric alcohol component of the esterifiable mixture is characterized by a substantial tendency to distill over with the water and the aromatic hydrocarbon so that some of it was lost with the water phase. In this way, large amounts of the dihydric alcohol component (as much as 10 or 15 percent by weight) were often lost from the system. If a satisfactory acid number, stability, curing rate and other properties were to be attained in the polyester component and if the mechanical properties of the ultimate interpolymer were to be maintained at a satisfactory level it was often necessary to employ considerable excesses of dihydric alcohol component to compensate for these losses. This was especially true in those instances where a relatively volatile dihydric alcohol such as propylene glycol was employed.

This invention comprises a method of and an apparatus for reducing such losses of dihydric alcohol in forming polyesters and in certain of its aspects, it comprises introducing into a closed reaction vessel a liquid diluent and a mixture of a polyhydric alcohol component and a polybasic acid component, at least a part of the latter being alpha-beta ethylenic. The diluent is selected to distill azeotropically with water evolved in the reaction. The vessel is then heated to esterification temperature and the vapor mixture from the reaction is passed into a column which is maintained at a graduated temperature with the exit end of the column at or near the boiling point of the azeotropic mixture passing from the column. An azeotropic mixture of water and medium in vapor form is removed from the top of the column condensed and the liquid phases are separated. The water may be discarded while the liquid medium is returned to the top of the column and from there it returns to the reaction zone. By carefully regulating the temperature in the top of the column, it is often possible to obtain a mixture of medium and water of reaction at the top of the column which is nearly free of vaporized dihydric alcohol. The azeotropic mixture can be condensed in a reflux condenser and the medium can be returned to the vessel without any great loss of dihydric alcohol. This is especially true during the early stages of the esterification reaction. The column thus provides a barrier zone to prevent the escape of polyhydric alcohol to the reflux condenser. The properties of the products prepared by the process, such as the strength of the ultimate resin derived from the polyester are usually very good.

For a better understanding of the invention, reference may be had to the accompanying drawing in which the single figure illustrates diagrammatically an appropriate embodiment of apparatus for use in the practice of the invention.

It will be appreciated that in actual embodiments of apparatus, such pumps for promoting flow of fluids and such other devices as are required by local conditions or by engineering practice may be added. These are omitted in the present drawing as being obvious.

The apparatus as shown in the drawing comprises a reaction vessel 10 which is illustrated as a round bottom flask having appropriate inlets which will be further discussed. Obviously, such vessel is suitable for small scale operations. For commercial use, a kettle or pot of metal of appropriate size is preferable. The other elements of apparatus will then be selected to a scale and design commensurate with the reaction vessel. The flask may be electrically heated by means of an electrical mantle 11 having resistance elements (not shown) and appropriate connections 12 and 13 for supplying the electrical current. The electrically heated jacket may be replaced by gas burners, or by fluid heated jackets designed for application of heat by circulation of a heating medium such as steam or a liquid medium.

As previously indicated, the flask 10 may be equipped with suitable outlets one of which (14) is for the insertion of a device such as a thermometer 16, thermocouple, or other convenient device for measuring the temperature of the liquid phase. Another outlet, 14a is for insertion of a similar device for determining the temperature of the vapors above the liquid line L. It is also desirable that the flask be equipped with suitable means for agitating the contents. In the specific embodiment of apparatus shown this takes the form of a neck 17 for the insertion of a delivery tube 18a, which extends down near the bottom of the flask, and constitutes means for bubbling an inert gas such as carbon dioxide or nitrogen through the reaction mixture. Such device can be employed either for agitating the liquids or for sweeping water and other volatile materials from the reaction zone. A mechanical stirrer could also be employed for agitation.

The flask is still further equipped with a neck 18 designed for the introduction of the reaction components and also for the insertion of the neck 19 of a column 20. The latter preferably includes a zone 21 which is filled with an appropriate packing such as glass beads, Berl saddles or any other appropriate packing material. The upper portion 22 of the column preferably is free of packing and constitutes a clearing zone. At its upper end, the column is provided with a neck-like head 23 which is sealed by a stopper, or other appropriate device as indicated at 24. A conventional thermometer or other temperature recording device 26 is inserted through this stopper and the lower end thereof preferably extends into the clearing zone 22 at the top of the column. Neck 23 is further provided with an upwardly slanted side arm 27, in which is inserted a thermostatic device 28 of appropriate design which is controlled by the environmental temperature of the vapors passing up the side arm. The device conveniently may be a bimetallic element, operating an electrical switch which is opened or closed with variations of the temperature of the vapor mixture in arm 27 to open or close the circuit of the electrical heating device 11. To this end, the thermostat is provided with a connection 29 to a power line (not shown) and a second connection 31 to the line 12 supplying current to the heating mantle 11. The flow of current through the latter may also be regulated manually by a rheostat indicated at 32. It is preferred to adjust thermostat 28 to maintain a temperature of about 95° C. to 105° C. in the top 23 of the column.

Side arm 27 is provided with a branch 33 adapted to conduct vapors from the column to the upper chamber 34 of an appropriate separator device 35 of a reflux condenser 36 and being sufficiently sloped to allow solvent to drain back into the top of column 20. The separator includes partition means 37 perforated at 37a for upward flow of solvent and having a downwardly directed delivery tube 38, connecting the chamber 34 with the chamber 34 with the chamber 39 in which the condensate stratifies into phases. The lower extremity of the separator terminates in a discharge tube portion 40 having a valve 41 by means of which excess water may be drained when desired.

The upper portion of the separator device 35 is provided with a neck 43 for the insertion of the end of the central tube 44 of condenser 36. Jacket, or envelope 47 of the latter is provided with an outlet arm 48 and an inlet arm 49 for cooling water. Vapors from the chamber 34 in the separator device pass upwardly into this condenser and the water and solvent medium are largely, or completely condensed out and are returned to the chamber 34 from which they drain downwardly through tube 38 into the separator zone 39. The water forms a lower layer in the latter zone and it may be drained off from time to time by opening the valve 41. Condensed medium returns through the branch 33 and side arm 27 to the top of the column 20 and ultimately makes its way downwardly through the latter to the reaction flask 10.

The upper end of the central tube 44, as shown in the drawing, is open to the atmosphere thus maintaining barometric pressure in the apparatus. However, it will be apparent that it could also be connected to a source of vacuum (not shown) designed to maintain a subatmospheric pressure in the apparatus. Obviously, such application of vacuum will assist in removing water of reaction from the reaction zone.

While it is usually preferred to return the xylene or other inert medium to the reaction zone through the top of the column 20, some of the advantages attending the practice of the invention may be attained without such return of medium. For example, the xylene may be drawn off through tube 40, and reserved for future application, if so desired. By properly maintaining the temperature in the intermediate portion of the system, namely in or about the neck 23 at the temperature of azeotropic distillation of water of reaction and medium, the column with its appurtenant arms and branches can be made to operate as a barrier zone which, to a considerable extent, prevents the escape of the polyhydric alcohol from the system and returns it to flask 10 through the packing in zone 21.

In the operation of the apparatus illustrated in the drawing, the kettle 10 is provided with a charge suitable for preparation of a polyester. This charge may comprise the common ingredients employed in such polyesters, for example, an alpha-beta ethylenically unsaturated dicarboxylic acid such as maleic acid, fumaric acid, itaconic acid, or the like. These acids may be employed singly or in combination. Quite often, they are mixed with substantial amounts of acids which are free of ethylenic unsaturation and being represented by phthalic acid, tetrachlorophthalic acid, terephthalic acid, succinic acid, adipic acid, sebacic acid and azelaic acid, and derivatives thereof containing halogen or other substituents in the hydrocarbon portion.

The usual polyhydric alcohols are dihydric and include ethylene glycol, propylene glycol, diethylene glycol, trimethylene glycol, butanediol-1,3 and butanediol-2,3. Of these several glycols, propylene glycol is at present most commonly employed. With this glycol, quite substantial savings from loss with the water of reaction can be accomplished by use of the process and apparatus of this invention.

Xylene or toluene are usually preferred as reflux media for the kettle, but others are within the scope of the invention. Examples of such other media include benzene, ethyl benzene, aromatic petroleum naphthas, and other liquid media that will distill azeotropically with the water of reaction.

The temperature of distillation of the azeotropic mixture should be below the boiling point of the mixture of the medium and the dihydric alcohol component; the medium should also be selected so as to obviate the formation of a ternary vapor mixture of dihydric alcohol, water and medium at the top of the column. Naturally, if other media than xylene are employed, adjustment of temperature in the column 20 from the values herein mentioned must be made to attain the approximate boiling point of the azeotropic mixture of water and medium in the zone 22. The media are employed in amounts sufficient to provide an adequate removal of water through reflux action between the kettle 10 and the condenser system 36. An excess of the medium is permissible, but the amount may be relatively small since the same material is refluxed over and over between the vessel 10 and the condenser 36.

It is a feature of the present invention that small stabilizing amounts of inhibitor compounds designed to prevent premature gelation of interpolymerizable mixtures of the polyesters prepared by the present invention and ethylenically unsaturated monomers, may be incorporated with the charge in the vessel 10, or at any desired stage of the reaction. Inhibitors which may be so incorporated, include the phenolic types such as hydroquinone, t-butyl catechol, 3-isopropyl catechol, and the like. The cooking of the inhibitor compound into the polyester is not a particular feature of the present invention and it is to be understood that the inhibitor may also be added to the polyester after the esterification reaction is complete.

A charge comprising a glycol such as propylene glycol, a polycarboxylic acid such as maleic acid (with or without addition of non-ethylenic types of dicarboxylic acids such as phthalic acid or adipic acid) together with a reflux medium such as xylene, is heated without catalysts in the container 10 until reaction of esterification between the alcoholic component and the polycarboxylic acid component is initiated. The reaction is of exothermic nature and it is allowed to proceed without application of external heat until the evolution of heat subsides. During this stage, partial esterification probably occurs and when this stage is completed the heat may again be turned on and the batch allowed to attain an esterification temperature of about 150° C. to 205° C. At this temperature, the xylene vapors and the vapors from the reaction mixture pass upwardly through the column 20 and the water and xylene are subsequently condensed and then separated in the condenser 36 and its attendant separator device 35.

To prevent the escape of glycol component from the system, the temperature in the top portions of the column 20 preferably is maintained within the range of about 95° C. to 105° C. The temperature at the bottom of the column usually will be within a range of about 130° C. to 150° C. These specific temperatures values apply to the charges indicated, that is, for those in which the alcoholic component primarily is propylene glycol and the reflux medium is xylene. Appropriate changes will be made if other reflux media such as those previously described as being applicable in the operation of the system are employed.

The above temperatures are the holding temperatures where xylene is the azeotrop-forming component and the glycol is propylene glycol, they may be attained and maintained automatically by appropriate setting of thermostat 28. The smoothness of operation of the heating system can be promoted by adjustment of the rheostat 32. The desired critical temperature in the top of column 20 can also be maintained, or maintenance thereof can be approached by circulation of a heat exchange medium about the zone 22.

Automatic control of the temperature in the top of the column through the agency of thermostat 28 has been emphasized, but the same effect could be attained manually, by observance of thermometer 26 and adjustment of rheostat 32 to attain desired reading.

When the desired operating temperatures are attained in the column 20, xylene and water as an azeotropic mixture, will pass over through the side arm 27 to the chamber 34 and from there it will pass upwardly through the tube 44 and will be condensed. The resultant liquids drop back down through the chamber 34 and the tube 38 into the separator chamber 39 where the water collects at the bottom while the reaction medium such as xylene collects at the top for return through the side arm to the zone 22, and from the latter it flows downwardly through the packing at 21 and the stem 19 to the reaction zone.

The use of the process as applied to the foregoing apparatus is illustrated as follows:

*Example 1*

In this example, the reaction flask 10 was charged with a mixture comprising:

| | Grams |
|---|---|
| Maleic anhydride | 784 |
| Phthalic anhydride | 1776 |
| Propylene glycol | 1155 |
| Diethylene glycol | 530 |
| Xylene | 250 |
| Triphenyl phosphite | 4.2 |

Upon a molar basis this mixture comprised 1 percent excess of propylene glycol. The reaction mixture in the flask was brought to refluxing temperature and was maintained at such temperature for a total cooking time of approximately 15 hours. During this time, a vapor mixture, presumably an azeotropic mixture of evolved water and xylene with some glycols, passed upwardly through the column 20. The glycols were largely recovered in the top of the column owing to the favorable temperature of about 95° C. to 105° C. in the head 23, and were returned through the column 20 to flask 10; while the xylene and water azeotrope passed over to the combination separator and condenser, where they were condensed in the condenser 36 and were stratified in chamber 39. The water was drawn off through the valve 41; the xylene flowed through opening 37a and returned through side arm 33 and branch 27 to the column, and from the latter returned through the packing to the reaction chamber to be recycled. The ester product in the flask 10 was then blown with inert gas to remove residual volatile matter such as traces of water and xylene.

The time-temperature schedule was as follows:

| Time | Pot Temp., ° C. | Column Temperature °C. | | Events |
|---|---|---|---|---|
| | | Bottom | Head | |
| 0 hrs | | | | |
| 30 min | 165 | 130 | | Started xylene to top of column. |
| 50 min | 164 | 138 | 107 | Adjusted head temperature. |
| 1 hr. 10 min | 170 | 140 | 96 | |
| 1 hr. 25 min | 171 | 138 | 95 | |
| 2 hr. 20 min | 174 | 140 | 100 | |
| 3 hr. 40 min | 178 | 139 | 98 | |
| 5 hr. 40 min | 185 | 142 | 102 | |
| 10 hr. 40 min | 187 | 146 | 98 | |

At this point reaction was stopped; was again started next day.

| Time | Pot Temp., ° C. | Column Temperature, ° C. | | Events |
|---|---|---|---|---|
| | | Bottom | Head | |
| 0 hrs | 200 | 146 | 98 | Added xylene. |
| 1 hr | 198 | 144 | 97 | |
| 1 hr. 30 min | 204 | 143 | 94 | Do. |
| 2 hr. 5 min | 194 | 143 | 100 | |
| 4 hr. 5 min | 193 | | | |
| 4 hr. 25 min | 194 | | | Began blowing with inert gas. |
| 4 hr. 40 min | | | | Dropped charge. |

The final acid number of the polyester was 49.4 The viscosity Gardner-Holdt was L, in a 60 percent solution in ethyl cellosolve.

To a 1449 gram quantity of the foregoing polyester was added 3.36 grams of trimethyl benzyl ammonium chloride solution which constituted an inhibitor of gelation. Likewise, 0.1 milliliter of a 1 percent solution of quinone in styrene was added further to reinforce the inhibitory effect. To the polyester was also added 2.1 grams of 2,4-dihydroxy benzophenone constituting a light stabilizer for the ultimate product.

To the stabilized mixture was added 651 grams of styrene to provide an interpolymerizable liquid mixture. In order to determine the stability of the resultant interpolymerizable mixture, a sample was stored in an oven at 120° F. The stability was 45 days. A second sample at 150° F. was stable for 15 days.

This interpolymerizable mixture was a statisfactory product which could be stored for long periods of time at room temperature without danger of premature gelation. It could readily be mixed with free radical type catalysts of interpolymerization such as benzoyl peroxide, tertiary butyl hydroperoxide, cumene hydroperoxide and many other free radical initiators in well known manner. The resultant catalyzed mixtures, when poured into molds and heated to temperatures of about 75° C. to 150° C., would polymerize readily to provide hard, clear resinous products. The interpolymerizable mixtures could also be applied by impregnation, to glass fiber sheets, paper sheets, asbestos sheets, or others and laid up to form laminates useful as instrument panels in automobiles, airplanes and for many other applications.

It will be apparent that in the foregoing example, only about 1 percent molar excess of glycol was used. This was a very substantial saving in glycol as compared with conventional procedures in which the reaction is conducted in a container which is not equipped with a column designed for the maintenance of a head temperature in the range of about 95° C. to 105° C. In such conventional procedure, quite substantial amounts of the glycol component and notably of relatively volatile glycols such as propylene glycol are carried over with the reflux medium and are lost with the water of reaction which is discarded. In conventional practice, about 5 to 15 percent excess glycol such as propylene glycol is required, if a reasonably low acid value is to be attained in the polyester.

It will be apparent that the embodiment of apparatus and the techniques of operating the same are to be considered as being by way of illustration. It will be apparent to those skilled in the art that numerous modifications may be made therein without departure from the spirit of the invention or the scope of the appended claims.

I claim:

1. A method of preparing a polyester of a dihydric alcohol component, said alcohol component being saturated aliphatic and containing 2 to 4 carbon atoms and an alpha-beta ethylenically unsaturated dicarboxylic acid component, which comprises heating to esterification temperature in a reaction zone, a mixture of said alcohol and said dicarboxylic acid in a non-reactive liquid medium adapted to form a mixture capable of distilling azeotropically with the water of reaction and being an aromatic liquid hydrocarbon of a class consisting of xylene, toluene, benzene, ethylbenzene and liquid aromatic petroleum naphthas, said method comprising heating said mixture to a temperature to produce esterification reaction between the alcohol and the ester and to drive off vapors of water, dihydric alcohol and medium, passing the vapors through a barrier zone for dihydric alcohol, one end of said zone being below the boiling point of the medium and above the boiling point of the azeotropic mixture of water and said alcohol, maintaining another portion of the zone at about the boiling point of said azeotropic mixture of water and said medium, to expel vapors of said azeotropic mixture and to condense vapors of said dihydric alcohol, returning condensed dihydric alcohol to the reaction zone while passing the azeotropic mixture of vapors of said medium and water to a zone of condensation whereby to condense the vapors, separating the water from said medium and returning said medium to the second mentioned portion of the barrier zone.

2. A method as defined in claim 1 in which the dihydric alcohol is propylene glycol.

3. A method as defined in claim 1 in which the dihydric alcohol is propylene glycol and the medium is xylene.

4. A method as defined in claim 1 in which the dihydric alcohol comprises propylene glycol and the dicarboxylic acid component comprises maleic acid and the medium comprises an aromatic hydrocarbon containing a single benzene ring.

5. A method as defined in claim 4 in which the medium is xylene.

6. The method of claim 5 in which the second mentioned portion of the barrier zone is maintained at a temperature in a range of about 95° C. to 105° C.

7. A method of preparing a polyester of a dihydric alcohol component, said alcohol component being saturated aliphatic and containing 2 to 4 carbon atoms and an alpha-beta ethylenically unsaturated dicarboxylic acid component which comprises heating in a reaction zone a mixture in approximately stoichiometric portions of said components, said components being mixed with a medium adapted to form an azeotropic mixture with water and boiling above the temperature of esterification of said components and being an aromatic liquid hydrocarbon of a class consisting of xylene, toluene, benzene, ethylbenzene and liquid aromatic petroleum naphthas, to drive off a vapor mixture of water, medium and a small amount of said dihydric alcohol component, passing the vapors into a barrier zone at a portion thereof which is above the boiling point of the azeotropic mixture of water and medium and below the boiling point of the medium, cooling a second portion of the barrier zone to a temperature approximating the boiling point of said azeotropic mixture conducting away from the latter zone vapors of said azeotropic mixture, condensing the azeotropic mixture, separating the water from the condensate and returning the liquid medium to the second mentioned portion of the barrier zone.

8. A method as defined in claim 7 in which the dicarboxylic acid component of said polyester comprises a mixture of an alpha-beta ethylenic dicarboxylic acid and a dicarboxylic acid free of unsaturation other than benzenoid unsaturation.

9. A method of preparing a polyester of a mixture of maleic anhydride, phthalic anhydride, propylene glycol and diethylene glycol, which comprises mixing the same with xylene, heating the mixture to esterification temperature in a reaction zone to drive off vapors of water, propylene glycol and xylene as a vapor mixture, withdrawing the mixture from the zone and passing the vapor mixture through a zone, the point of initial contact of which is at a temperature of 130° C. to 150° C. and the exit portion of which is at a temperature of 95° C. to 105° C., withdrawing an azeotropic mixture of water and xylene from the second portion, condensing said azeotropic mixture, separating the water from the xylene and returning the latter to said second portion.

10. In a method of conserving propylene glycol from a mixture of xylene, propylene glycol and an alpha-beta ethylenic dicarboxylic acid heated to a temperature of about 150° C. to 205° C. to esterify the same, which comprises taking off from the reaction zone, a vapor mixture of xylene and water containing vapors of propylene glycol, withdrawing the vapor mixture from the zone conducting said vapor mixture upwardly through a vertically elongated zone which at the lower end is at a temperature of about 130° C. to 150° C. and at the upper end is at a temperature of about 95° C. to 105° C. and then condensing the azeotropic mixture of water and xylene emergent from the upper end, separating the water from the xylene and returning the xylene to the upper end of the zone.

11. The method as defined in claim 7 in which the dicarboxylic acid component of said polyester comprises a mixture of maleic acid and an acid of a class consisting of phthalic acid, terephthalic acid, tetrachlorophthalic acid, succinic acid, adipic acid, sebacic acid, and azelaic acid.

References Cited in the file of this patent

UNITED STATES PATENTS

| | | |
|---|---|---|
| 2,057,766 | Brubaker | Oct. 20, 1936 |
| 2,249,768 | Kropa | July 22, 1941 |
| 2,279,764 | Smith et al. | Apr. 14, 1942 |
| 2,410,073 | Howard | Oct. 29, 1946 |
| 2,584,315 | Agnew | Feb. 5, 1952 |
| 2,668,848 | Neuworth | Feb. 9, 1954 |

FOREIGN PATENTS

| | | |
|---|---|---|
| 645,218 | Great Britain | Oct. 25, 1950 |

OTHER REFERENCES

Glasstone: Textbook of Physical Chemistry, 2nd, ed., 1946, published by D. Van Nostrand Co., Inc., New York, N.Y., pages 720 and 721.

Groggins: Unit Processes in Organic Synthesis, 4th ed., pg. 636, McGraw Hill Book Co., Inc., N.Y., 1952.

UNITED STATES PATENT OFFICE

CERTIFICATE OF CORRECTION

Patent No. 2,892,812                                    June 30, 1959

Clarence H. Helbing

It is hereby certified that error appears in the printed specification of the above numbered patent requiring correction and that the said Letters Patent should read as corrected below.

Column 3, lines 32 and 33, strike out "with the chamber 34".

Signed and sealed this 14th day of June 1960.

(SEAL)
Attest:

KARL H. AXLINE                                      ROBERT C. WATSON
Attesting Officer                                    Commissioner of Patents